(12) United States Patent
Kauppinen (10) Patent No.: US 7,657,223 B2
(45) Date of Patent: Feb. 2, 2010

(54) PROVISION OF CONTENT TO MOBILE USERS

(75) Inventor: Risto Kauppinen, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 1353 days.

(21) Appl. No.: 10/421,937

(22) Filed: Apr. 24, 2003

(65) Prior Publication Data

US 2004/0152454 A1 Aug. 5, 2004

Related U.S. Application Data

(60) Provisional application No. 60/444,688, filed on Feb. 4, 2003.

(51) Int. Cl.
*H04H 20/71* (2008.01)

(52) U.S. Cl. .............. 455/3.03; 379/88.13; 379/88.14; 379/88.17; 379/88.18; 379/201.01; 455/2.01; 455/3.01; 455/3.02; 455/3.04; 455/3.05; 455/3.06; 455/414.3; 709/201; 709/202; 709/207; 709/208; 709/232; 715/718; 715/742; 715/749

(58) Field of Classification Search ............... 455/2.01, 455/3.01–3.06, 414.3; 700/9–18; 707/9–10; 715/741–743, 718, 749; 379/88.13–88.14, 379/88.17–88.18, 201.01; 709/201–203, 709/207–208, 232
See application file for complete search history.

(56) References Cited

U.S. PATENT DOCUMENTS

| | | | |
|---|---|---|---|
| 5,733,131 A * | 3/1998 | Park ...................... 434/307 R |
| 6,016,478 A * | 1/2000 | Zhang et al. .................. 705/9 |
| 6,230,027 B1 * | 5/2001 | Habib ........................ 455/566 |
| 6,237,022 B1 * | 5/2001 | Bruck et al. ................ 709/201 |
| 6,526,486 B2 | 2/2003 | Theimer |
| 6,636,790 B1 * | 10/2003 | Lightner et al. ............... 701/33 |
| 6,775,690 B1 * | 8/2004 | Creswell et al. ............. 709/206 |
| 6,816,703 B1 * | 11/2004 | Wood et al. ................ 455/3.04 |
| 6,834,195 B2 * | 12/2004 | Brandenberg et al. .... 455/456.3 |
| 6,931,007 B2 * | 8/2005 | Jones ........................ 370/392 |
| 6,970,698 B2 * | 11/2005 | Majmundar et al. ......... 455/419 |
| 6,976,009 B2 * | 12/2005 | Tadayon et al. ............... 705/51 |
| 7,130,648 B1 | 10/2006 | Fournier et al. |
| 7,305,441 B2 * | 12/2007 | Mathewson et al. ......... 709/206 |
| 2002/0062445 A1 * | 5/2002 | Owada et al. ............... 713/193 |
| 2002/0085027 A1 | 7/2002 | Kim |
| 2005/0177419 A1 * | 8/2005 | Choi et al. .................... 705/14 |

FOREIGN PATENT DOCUMENTS

| | | |
|---|---|---|
| DE | 197 45 540 A1 | 4/1999 |
| JP | H12-2000-201119 | 7/2000 |
| WO | WO 01/30093 A1 | 4/2001 |
| WO | WO 01/35658 | 5/2001 |
| WO | WO 01/35658 A1 * | 5/2001 |

* cited by examiner

*Primary Examiner*—Hemant Patel
(74) *Attorney, Agent, or Firm*—Squire, Sanders & Dempsey, LLP (57) ABSTRACT

The present invention relates to presentation of content to mobile users. In the method, data associated with presentation of content is transmitted from a communication system, the data including information regarding an event. The data is received at mobile user equipment and stored in a memory of the mobile user equipment. In response to the event, presentation of the content is triggered. The presentation is based on the data stored in the memory of the mobile user equipment.

38 Claims, 4 Drawing Sheets

PROVISION OF CONTENT TO MOBILE USERS

CROSS REFERENCE TO RELATED APPLICATIONS

This application claims priority of U.S. Provisional Patent Application Ser. No. 60/444,688, entitled "Provision of Content to Mobile Users," filed on Feb. 4, 2003, the contents of which are hereby incorporated by reference.

BACKGROUND OF THE INVENTION

1. Field of the Invention

The present invention relates to provision of services to mobile users, and more particularly, to presentation of content to mobile users by means of a mobile communication system. The content is presented by means of mobile user equipment which receives the required data from a transmitter of the mobile communication system.

2. Description of the Related Art

A mobile communication system can be seen as a facility that enables a mobile user to communicate with one or more other entities such as another user equipment and/or nodes implemented within the communication system. A typical mobile communication system provides mobility by means of wireless communication between mobile user equipment and transceiver elements of the communication system. The mobile user equipment may be served by base stations of a mobile telecommunication network, such as a public land mobile network (PLMN). The mobile user may move from a base station of the mobile network to another base station. The mobile communication systems may also allow the mobile user to roam in mobile networks other than that to which the mobile user subscribes to. A mobile user may also be served by communication satellites of a satellite based mobile communication system.

The mobile users may be provided with a possibility to use various services, and the communication may comprise communication of data that relates to provision of a service. The services are typically provided by entities referred to as service providers. The services provided for a user may comprise any service than can be provisioned by means of the communication system. For example, a mobile user may be provided with a possibility to make and receive calls, to browse a data network (e.g. the Internet), to send and receive emails or other text messages, to receive various types of content from a server entity (e.g. video data or other image or audio data), to attend chat rooms, to use various other value added services such as the presence service, location based services, or to attend games, competitions, voting services, and so on. This specification concentrates to provisioning mobile user equipment with data based on which a mobile user can be presented content such as audio presentations, visual presentation or audiovisual presentations and so on. The audiovisual presentations are often referenced to by the term 'multimedia'.

The service providers may provide services based on different service architectures. For example, the service provision may be based, without being limited to these, on a third generation (3G) multimedia service architecture, an intelligent network (IN) architecture, a service node based architecture, or any other service architecture. In some service architectures the service provisioning is at least partially handled by means of the user equipment.

A possibility is to 'push' data to the user equipment. That is, the service provider sends data to user equipment without being especially requested by the user to do so. The data push may be triggered at the network side e.g. periodically or in response to an event triggering the data transmission. Push type services are typically used for broadcasting of advertisements, general announcements, news and so on to mobile users.

Users may also participate by means of the mobile user equipment in various types of interactive services such as game and quiz shows. These shows are typically presented to the user by radio or TV programs. The communication and participation has traditionally been handled with voice calls. In more recent applications short message service (SMS) has been utilized for the provisioning of interactivity.

It is possible to provide the content by means of the push services. However, the content that is wished to be presented for the users may be such that it requires more data to be transmitted than is possible, for example, by means of the SMS. The recent proposals to overcome this problem include use of all IP (Internet Protocol) networks for the interactive services. The all IP networks enable the users to receive more content data. The enhanced content is sometimes referenced to as 'rich content'.

The current definitions in different types of push services define the mechanism how to subscribe and deliver the content to the end users. For example, session initiation protocol (SIP) push content data transmission enables transmission of substantial amount of data. The SIP push content data can also be pushed to a plurality of users.

However, the Inventor has found that although the basic mechanism may already be in place, the proposals may still not work satisfactorily in all occasions, especially when considering the capacity limitations of the mobile communication systems.

More particularly, the inventor has found that provision of a service for a mobile user may require transmission of such amounts of content data that this cannot be conveniently done in real-time, i.e. when the user actually uses the service. Content data may need to be delivered to a substantial number of mobile users at the same time, e.g. during a TV or radio program, thus setting substantial capacity requirements for the data transmission system. It may not even be possible in all networks to push content data to a large number of mobile users within a substantially short period of time. The capacity limitations may become even more an issue when more services are made available for mobile users. Furthermore, the capacity limitations are worsened by the fact that the number of mobile user equipment subscribing to modern mobile data communication systems offering possibilities for a wide range of new type of services increases rapidly.

Thus, in order to be able to extend the push service to enable better and more flexible service offering for various services such as interactive services (e.g. games, quiz shows, mass events) and so on, an improved data provisioning functionality may be needed.

SUMMARY OF THE INVENTION

Embodiments of the present invention aim to address one or several of the above problems.

According to one aspect of the present invention, there is provided a method of presenting content. The method includes the steps of transmitting from a transmitter of a communication system data associated with presentation of content, the data including information regarding an event, receiving the data at mobile user equipment and storing the data in a memory of the mobile user equipment. In response to the event, presentation of the content is triggered based on the data stored in the memory of the mobile user equipment.

According to another aspect of the present invention there is provided a communication system adapted for provision of wireless data communication services for mobile users. The communication system includes at least one transmitter for wireless transmission of data enabling presentation of content to the mobile users, a service provisioning entity for handling the generation of the data, the service provisioning entity being adapted to include into the data information regarding an event triggering the presentation of the content and a mobile user equipment comprising a receiver for receiving the data from the at least one transmitter, a memory for storing data received by the receiver, and a controller for controlling the presentation of the content based on data stored in the memory. The presentation of the content is triggered by the event and the content is presented based on the data stored in the memory of the mobile user equipment.

According to still another aspect of the present invention there is provided a mobile user equipment adapted for provision of wireless data communication services for the user thereof. The mobile user equipment includes a receiver for receiving wireless transmission of data, the data enabling presentation of content to the user, a memory for storing data received by the receiver, user interface for presenting the content to the user, and a controller for interpreting the data and for detecting if the data includes information regarding an event triggering the presentation of the content and for monitoring for the event. The content is presented to the user via the user interface in response to detection of the event and based on the data stored in the memory.

In a more specific embodiment the event comprises expiry of a timer. The data received from the communication system may include a timing parameter. The timing parameter may be set by the provider of the content or an entity associated with the communication system. In the latter case the entity may set the timing parameter based on information received from the provider of the content. An executable timer may be received from the communication system within the content data.

The event may comprise reception of a triggering signal from the communication system. At least a part of the data may be encrypted to prevent the user of the user equipment to access the content before the event occurs. An acknowledgement of successful content delivery may be sent from the mobile user equipment. The acknowledgement may include the time when the content was delivered to the mobile user equipment.

The step of receiving the content may comprise receiving the content by a first application entity provided in the user equipment. In response to the event, the content may then be forwarded to a second application entity provided in the user equipment for presentation to the user of the user equipment. The steps of receiving, interpreting and presenting the content to a user may alternatively be handled by a single application entity of the user equipment.

The embodiments of the invention may be used to optimize the use of the capacity of a communication system. A substantial number of mobile users may be provided with a possibility to simultaneously use the same service, for example to interactively participate a game broadcasted by means of a TV or radio broadcasting system. The embodiments may enable service providers to take advantage of cheaper data transmission rates, e.g. by transmitting data to the mobile user equipment during off-peak times. The content data transmission can be distributed on a substantially long period of time. This allows lower simultaneous data transmission rates for transmission of the data required for the service provisioning to the mobile user equipment. The usability of push content type services may be improved.

BRIEF DESCRIPTION OF THE DRAWINGS:

For better understanding of the present invention, reference will now be made by way of example to the accompanying drawings in which:

FIG. 1 shows a communication system arrangement wherein the embodiments of the present invention may be applied to;

DETAILED DESCRIPTION OF THE PREFERRED EMBODIMENT(S)

Figure 1:
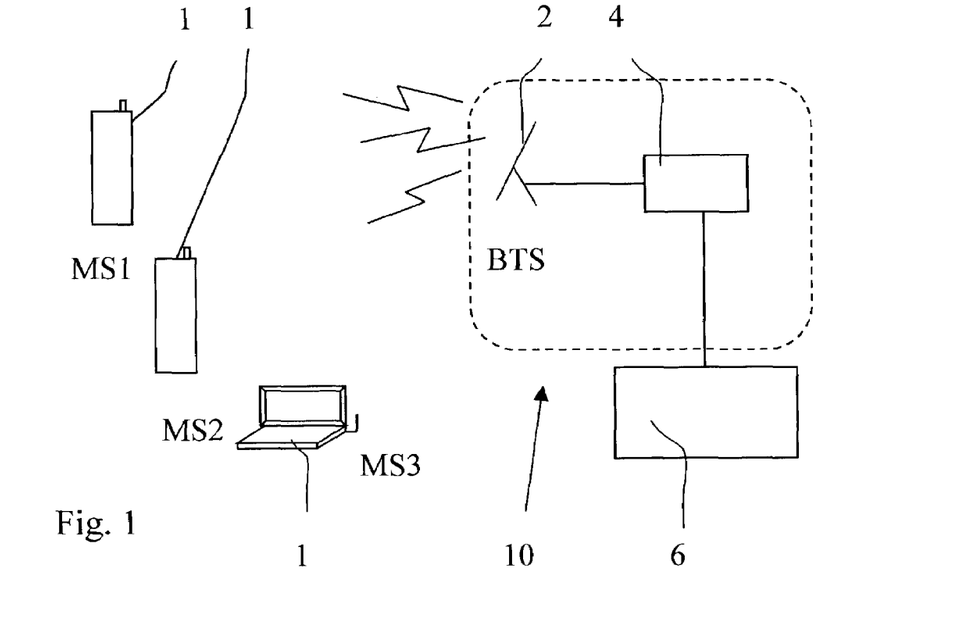

A simplified presentation of a mobile communication system is illustrated in FIG. 1. More particularly, FIG. 1 shows schematically a mobile communication network 10 within the dashed line. The mobile communication network 10 is adapted to provide wireless communication services for mobile user equipment.

A plurality of mobile user equipment 1 is shown to be in wireless communication with a base station 2 of the mobile communication network 10. It shall be appreciated that although FIG. 1 shows only three mobile user equipment 1 (MS1 to MS3) and one base station 2, a substantial number of mobile user equipment may be in simultaneous communication with the mobile communication network 10 via a plurality of base stations thereof. It shall also be appreciated that the mobile user equipment may be referenced to by the term "mobile station".

The skilled person is familiar with the required apparatus for implementing a mobile communication network. The mobile communication network 10 may comprise various network elements 4 such as radio network controllers, mobile switching centers, other switches and/or exchanges, and so on. One or more gateway nodes may also be provided for connecting the one network to other networks. The other networks may be based on different standards. As the elements of a mobile communication network as such do not form an essential element of the present invention, the mobile network is not described or shown in any more detail herein. It is sufficient to note that a mobile communication system operates in accordance with a given standard or specification which sets out what the various elements of the system are permitted to do and how that should be achieved. For example, the standard or specification may define if the user, or more precisely, user equipment such as a mobile station is provided with a circuit switched service and/or a packet switched service. Communication protocols and/or parameters which shall be used for the connection may also be defined. In other words, a specific set of "rules" on which the communication can be based on needs to be defined to enable communication by means of the system.

FIG. 1 shows also a service provisioning entity 6. The service provisioning entity 6 may be any appropriate application server or data processing entity capable of processing data for the purposes of provisioning a service application. The application server 6 may be operated by an organization referenced to as the service provider. The application server 6 functions to generate and communicate data associated with the content to the mobile user equipment 1 and also to receive data from the mobile user equipment. The application server may be provided as an element of the mobile communication system 10, or be connected thereto for enabling communication with the mobile user equipment 1. A more detailed example of the operation of such a service provisioning entity will be given later with reference to FIG. 3.

Figure 2:
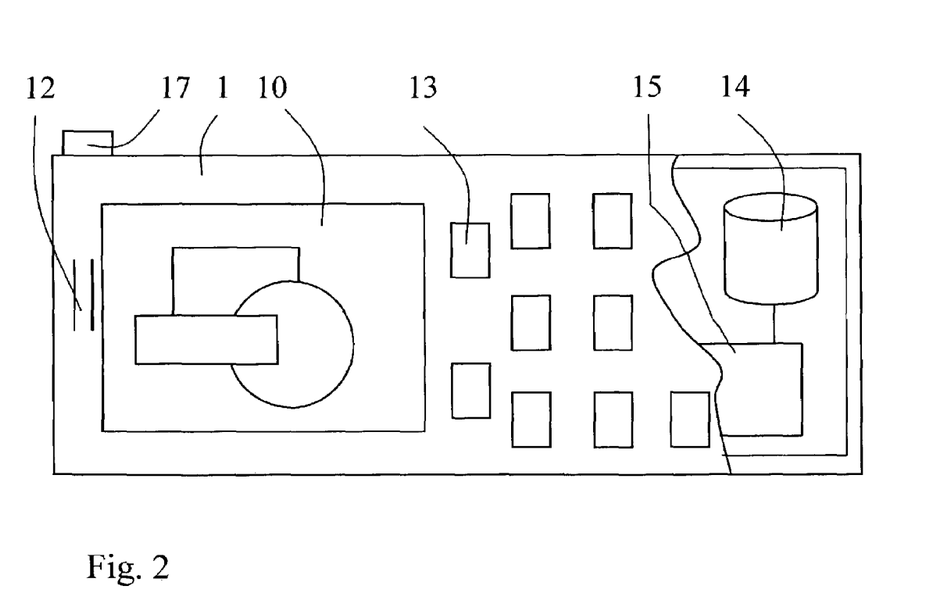
FIG. 2 shows a mobile user equipment suitable for use in the FIG. 1 environment.

FIG. 2 is a partially sectioned image of a possible mobile user equipment 1. The exemplifying user equipment 1 is shown to comprise an antenna element 17 for wirelessly receiving and transmitting signals from and to base stations of a mobile communication network. The mobile user equipment 1 is also provided with a display 10 for displaying images and other visual information for the user of the mobile user equipment 1. Speaker means 12 are also shown. The operation of the mobile user equipment 1 may be controlled by means of control buttons 13.

Furthermore, the mobile user equipment 1 is provided with a processor entity 15 and a memory means 14. The processor and memory means of the user equipment may be used for implementation of the embodiments of the present invention. More particularly, the processor 15 may be used for execution of various service applications at the user equipment. The memory 14 may be used for storing data for use by the service applications. The processor 15 may fetch data from the memory 14 via the connection between these two entities. However, it shall be appreciated that the memory and the processor may be formed as single unit, and that at least some data may be stored in the processor.

The skilled person is familiar with the features and operation of a typical mobile user equipment. Thus these do not need any further explanation. It is sufficient to note that the user may use the mobile user equipment 1 for task such as for making and receiving phone calls, for receiving content from the network and for experiencing the content presented by means of the display and/or the speaker and for interactive correspondence with another party. For example, the user may use the user equipment 1 for interactive participation to TV or radio programs, for receiving information related to mass events and so on.

The embodiments of the present invention provide applications that utilize push type data communication. In accordance with an embodiment, special information elements are generated by the service provisioning entity 6 and transported on top of a data bearer defined for a particular push service. The information elements can be transported to the user equipment 1 in good time before any content needs actually be presented to the user. The presentation is delayed until detection of a specific event.

The delayed presentation of the content is then triggered by the predefined event. In a preferred form of the present invention the event comprises expiry of a timer. Information required for the timer function may be provided for the user equipment together with the content pushed to the user equipment. Based on this information a timer function can be executed at the user equipment. Expiry of the timer in accordance with the received timing information will then trigger the content application to show the content to the user.

If the timer information is provided together with the content, the user equipment has to be provided with a function capable of interpreting the content so as to be able to 'dig' the timer information from the content. A standardized timing information parameter may also be defined as being a proprietary feature of the SIP or any other appropriate protocol. The user equipment could then be arranged to recognize the standardized timing parameter from the content.

The service application activation at the user equipment and thus presentation of the content to the user may be based on a timing parameter instructing the user equipment to present the content after a specific time. The timing parameter may give information regarding the expiry time for a timer provided at the user equipment.

The information may alternatively comprise all data needed for running a timer at the user equipment. That is, the timing information may comprise the code required for executing the timer function and the expiry time.

It may be advantageous to prevent the user to access the content before it is time to present the content. This may be implemented such that it is not possible for the user to see the content before the expiry of the timer. The timer may be encapsulated in the content data so that the timer can be executed invisibly for the user within the content. The encapsulation is accomplished such that it is not possible for the user to access the timer by the control interface of the user equipment. This can be provided by means of appropriate encryption of the content—the content may be encrypted such that only the content presentation application at the user equipment can decrypt the content. The possible encryption and decryption mechanisms are well known, and will thus be not explained in any greater detail.

The countdown of the timer may be started from the moment the content is received by the application in the user equipment 1. The time when to present the content may be defined such that the parameter is defined, for example, in days, hours, minutes and seconds. For example, if the timer value is set to start the timer for content presentation at the moment the content is received at the user equipment, timer value for content to be shown in 8 hours 19 minutes could be then be 00:08:19:00. Naturally, the value could be extended also to include further values such as the year.

The correct timer expiry value is preferably set by the sending service provider application.

If the content is delivered separately from the timer, the server responsible for setting the timer value may need to be provided with an acknowledgement from the user equipment that the content has been delivered to the user equipment. The content delivery can be acknowledged by an appropriate application at the user equipment. If the timer is send separately, this can be done by means of another dialogue that the content push between the application server and the application at the user equipment. The timer message may need to be provided with information regarding the content it associates with.

The timer value may also be set by an entity associated with the mobile network based on the internal clock of the network. A possibility to implement this is that the service provider delivers the content and the content showing time to a delivery server of the network. The delivery server may then take care of the delivery of the content data to the user equipment and set the timer parameter. In this case, the service provider may give a date and time (e.g. 20.12.2002, 19:07:00), and then the internal clock of the network may be used to calculate the timer value for the user equipment. By means of this the timer setting can be connected to decided content showing time in application where the internal clock of the communications network is used.

According to a still another possibility the timer is started when it is send from the application server 6. The timer may even be started at the time of transmission thereof from the network e.g. from the base station. If the parameter is defined by the service provider as a time that is it to be counted from the transmission of the content, this can be used to prevent the user for viewing the content earlier for example by setting the internal clock of the mobile user equipment in wrong time. The same effect can naturally be achieved by using a timer that runs from the reception of the content, as explained above.

Starting the timer at the network side may also be advantageous in some applications since this may make it possible to avoid problems in that different mobile user equipment may receive the content transmission at slightly different times.

Different data bearers may be used to deliver the content to the service application in the user equipment. For example, the content may be carried by means of a Session Initiation Protocol (SIP) bearer. If the bearer is carried by means of SIP, then the content can be delivered in the body of a SIP message.

Figure 3:
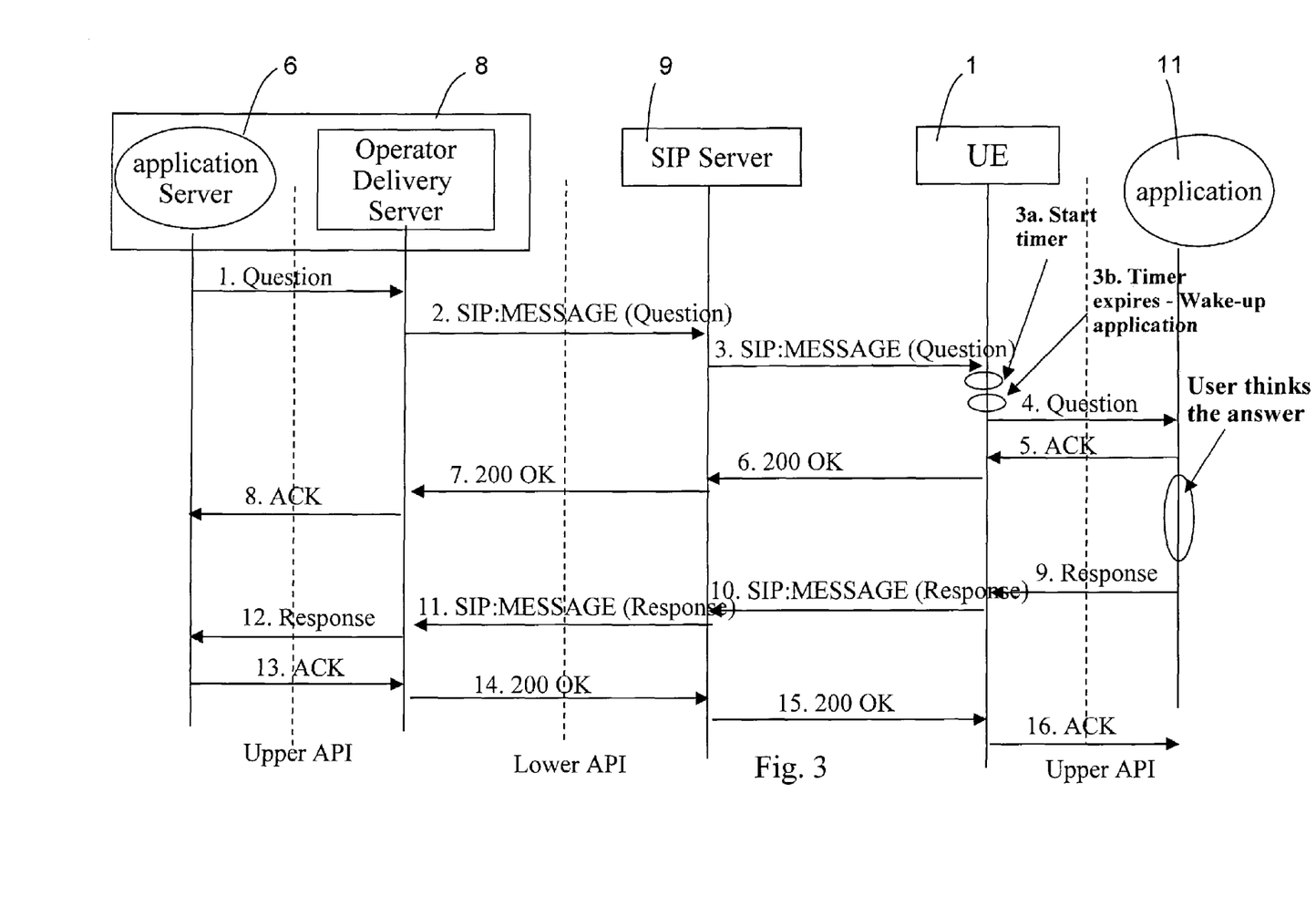
FIG. 3 is a signalling flowchart in accordance with an embodiment.

FIG. 3 illustrates a possible embodiment wherein the content comprises a question to be pushed over a mobile network to a user equipment 1. The content is to be delivered by means of session initiation protocol (SIP), the architecture being such that the user equipment 1 is provided with a SIP application 20 for receiving and sending SIP messages. The content presentation service functionality is then provided by a separate application, referenced to in the following as client application 11.

Figure 4:
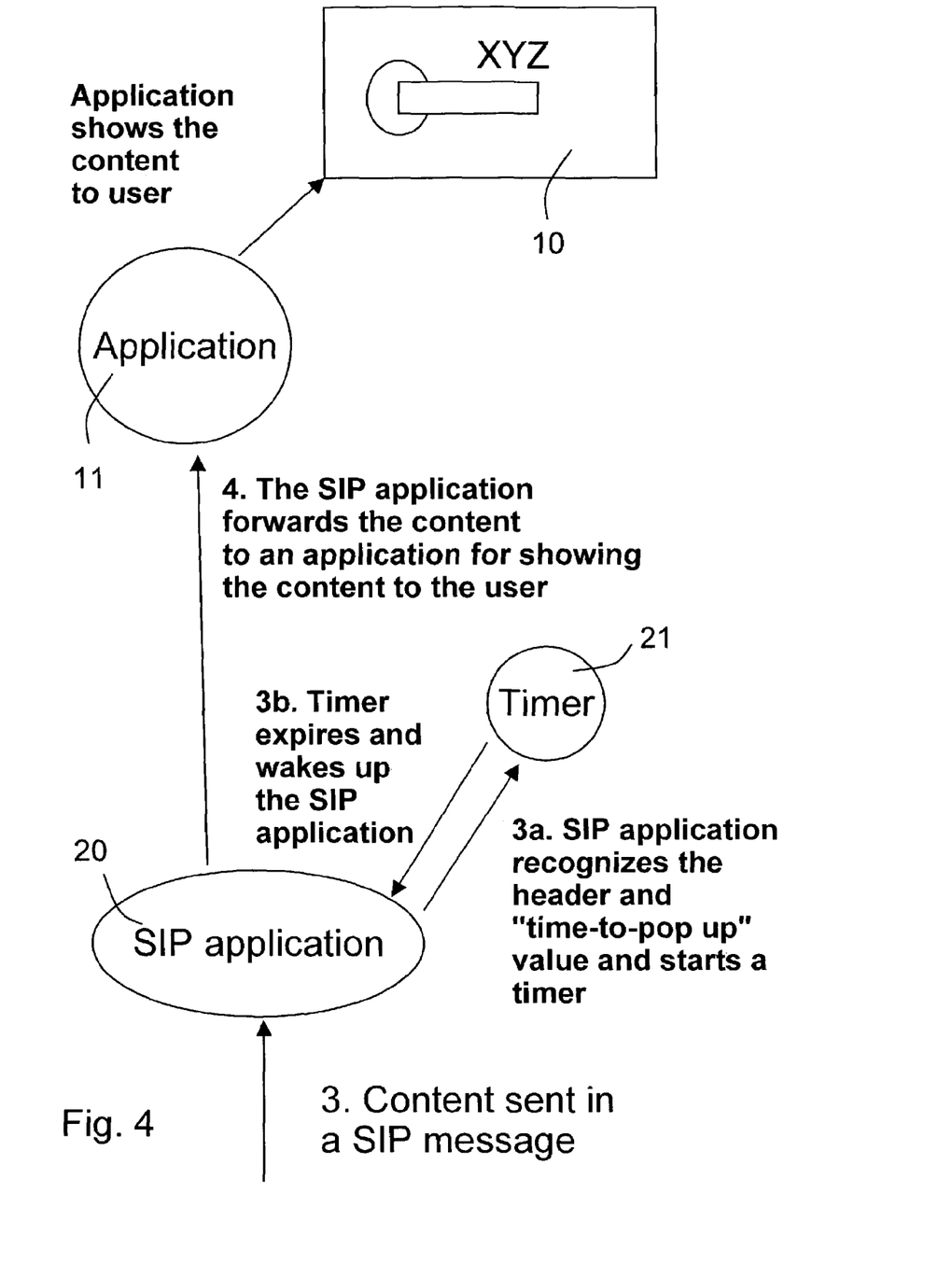
FIGS. 4 and 5 are functional flow diagrams for operation at the user equipment in accordance with two embodiments.

In the embodiment shown in FIGS. 3 and 4 the content data is provided for the client application 11 by the SIP application 20 only after the expiry of the timer.

In step 1 a service provisioning application server 6 sends a question to the user equipment. The question is transported to a delivery server 8 of the network operator. The delivery server 8 operator generates a SIP message, named as "MESSAGE", for transporting the content data to the user equipment 1.

The generated SIP message is then forwarded from the delivery server 8 to a SIP server 9 provided in the network. The SIP server 9 delivers at step 3 the SIP message further to the mobile user equipment 1 over a wireless interface.

The SIP message is then received at the user equipment 1 by the SIP application 20 thereof. Data associated with the content provisioning is stored into the memory means of the user equipment. As illustrated in more detail in FIG. 4, upon receipt of the SIP message a SIP application 20 at the user equipment recognizes that the content includes a timer. The timer 21 is started at step 3a. The expiry of the timer at step 3b triggers delivery of the content data i.e. the question to the client application 11 at the user equipment. Thus, after the expiry of the timer, the content data stored at the memory means of the user equipment 1 is sent to the client application 11 at step 4. The application 11 may then be executed so that the content is displayed or otherwise presented to the user e.g. by means of display 10 and/or speaker means of the user equipment.

The client application 11 may acknowledge the receipt of the question at Step 5. Thus confirmation and acknowledgement SIP messages 6, 7 and 8 may be transported back so as to inform the application server 6 that the question has been presented to the user.

At the same time the user may consider the possible answer. The response may then be messaged at step 9 from the client application 11 within the user equipment 1 to the SIP application entity of the user equipment for transmission. The SIP application 20 of the user equipment generates a SIP message and transmits the SIP message on step 10 via the wireless interface to the network 9. The SIP message is forwarded at step 11 to the delivery server 8 operator. The delivery server 8 interpret the SIP message and the response information is passed to the application server 6.

Usual SIP acknowledgements may then follow in Steps 13 to 16 to inform the application 11 at the user equipment 1 that the application server 6 has received the response.

Figure 5:
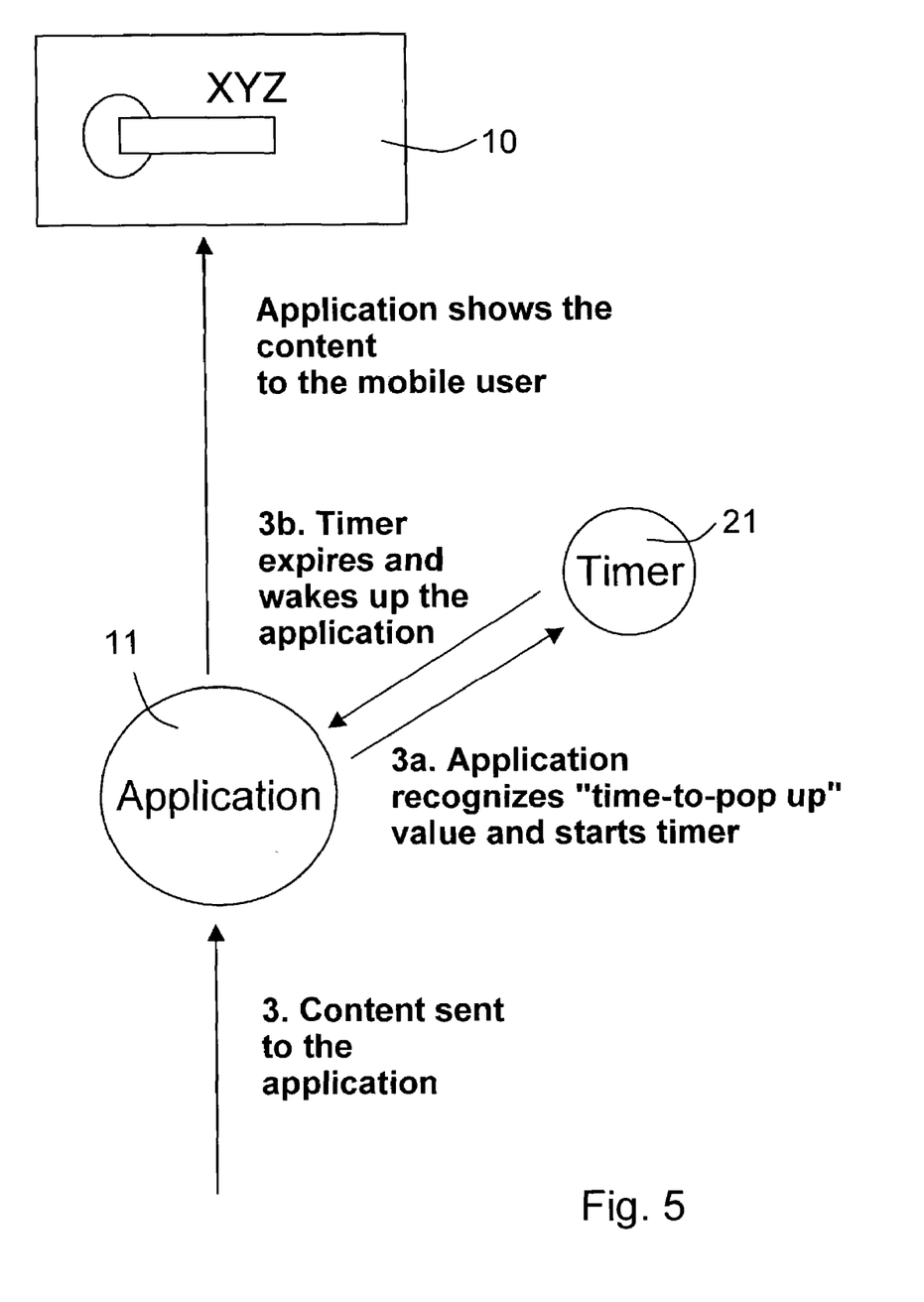

FIG. 5 shows an alternative for the FIG. 4 embodiment. Herein the content is received directly by the service executing application 11 of the user equipment. Thus the expiry of the timer 21 triggers directly the presentation of the content rather than delivery thereof from another application to the executing application.

It shall be appreciated that the timer function may be handled in various ways at the user equipment, FIGS. 4 and 5 only showing a couple of examples of the possibilities. As shown, the entity at the user equipment that is capable of interpreting the content (at least digging the timer) may start the timer. The expiry thereof then triggers the content application to show the content.

The manner how the content and recognition of the timing parameter is handled at the user equipment may depend on the layer on which the timing information such as the timing parameter is defined. As shown by FIGS. 4 and 5 the timing parameter recognition may be handled by a SIP application 20 of the user equipment 1 (FIG. 4) or the actual service application 11 executing the content presentation (FIG. 5). What is important is that if the timing parameter is transported within the content data, then the application receiving the content shall be able to understand the parameter.

However, it shall be understood that a timing information parameter may be specified in the communication protocol that is used for transportation of the content. In such instance it may be possible to interpret the parameter at the application level without any parameter detection steps.

The content may be pushed with the data transmission to user equipment that is already provided with appropriate service application (e.g. a java script). The service application may be installed or downloaded in the mobile user equipment at the time of purchase thereof or later on, e.g. when subscribing to the service.

The service application may also be pushed to the user equipment. All data required for execution of the content (i.e. the content and the service application) may be send in one push. For security reasons, however, it may be advantageous to separate the download of the service application and the content data. Furthermore, not all users may wish to receive executable applications into their user equipment without their acknowledgement.

In certain applications it might be advantageous if the user could see how many content applications have been received and are to be presented later on. Information regarding the size of the content may also be presented. The user may also be provided with a possibility to delete content before it pops up, for example if there is a memory problem or if the user does not want to experience the content at all.

The above-described solution can be used, for example, in provisioning mobile users with services such as interactive contests. The contest can be for example a live TV or radio show where the viewers or listeners may compete on-line. The contest application in the user equipment for presenting the content may be a generic application or an application specific for the particular contest.

The content can be pushed to a substantial number of user equipment before the contest starts. For example, the content may be pushed during the previous day and night for all user equipment who have subscribed to the possibility to participate the contest or to such mobile station user equipment which are provided with a service application enabling participation to various contests and so on.

The event triggering the presentation may be other than the expiry of a timer. For example, the event may comprise reception of a triggering signal from the communication system.

The invention is, naturally, not limited to services such as contests, quiz shows, opinion polls and the like. Instead, the invention may also be used to various other purposes such as to simultaneous presentation of announcements to a large number of users. For example, a mass event may be organised wherein the participants need to be given simultaneously new sets of instructions e.g. where to go or what to look at as the mass event progresses. An example of such event is a festival with a large number of participants. In certain competitions (e.g. in sports like orienteering) a great number of competitors may need to be provided with new tasks and instructions, and it may be advantageous if these can be presented for a large group of mobile users at the same time while avoiding the risk of some of the contestants seeing the instructions beforehand.

In addition, the content may be sent for example for maintenance or diagnosis applications. Such applications may be set to run say, after 2 o'clock in the morning for example.

The application at the user equipment may be provided with added intelligence. For example, the application may send only correct answers back to the network. The correct answer may be provided for the application with the content. This kind of filtering may be advantageous in reducing the load on the network.

In addition to the timer information other information may also be sent to the user equipment. For example, information may be needed to so as to identify the application at the user equipment to which the content is intended to. This may be required e.g. when several applications are offered to users. An application ID may be added into the content for this purpose. The content may also include a parameter defining how much time the user has to respond to a question. If the user does not respond within the defined time, the content may be deleted from the memory.

Different service provision architectures are possible for implementing the service in accordance with the principles of the present invention. Thus it is understood that although the description was given with reference to SIP based service architecture such as IMS (Internet Protocol Multimedia Subsystem), the services may be provided based on any appropriate service provisioning architecture. Examples of these include, architectures such as IN (Intelligent Network) or CAMEL (Customised Applications for Mobile network Enhanced Logic), service node based architecture such as the APSE (Application Server Architecture), Parlay based architecture, a user equipment based architecture, and so on.

The protocol may depend on the selected service provisioning architecture. The communication between the mobile user equipment and the transceiver elements of the communication network can be based on any appropriate communication protocol. Thus the communication protocols may be different from the above mentioned SIP and SMS. The Multimedia Messaging Service(MMS) and Wireless Application Protocol (WAP) are given as other non-limiting examples of appropriate protocols.

A plurality of service providers may provide the services. A user equipment may be provided with services that are based on a plurality of different service architectures.

The mobile network delivering the content from an application server to client applications provided in mobile user equipment and backward, if required, does not necessarily need to be made aware of these additional information elements. The concept of defining new information elements on top of a push service may be based e.g. on use of any appropriate open architecture.

It shall also be understood that since the invention makes it easier to provide content to mobile user equipment in different service concepts and new service concepts, the possible services are not limited to the examples discussed above.

The beforehand occurring downloading of questions, instructions, adverts or other content may be used to optimize the use of a network and to limit traffic peaks. In general, if the content is downloaded during the off-peak hours or whenever there is not much traffic for any reason in the network, this may be used for ensuring that the network is not unnecessarily loaded for example because of hugely popular quiz shows. Since it is no longer necessary to push content at the time when the questions are presented e.g. by the host of the quiz show, the capacity can be used for other purposes, for example, for receiving the answers.

It is noted herein that while the above describes exemplifying embodiments of the invention, there are several variations and modifications which may be made to the disclosed solution without departing from the scope of the present invention as defined in the appended claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
receiving at a mobile device, from a transmitter of a communication system, data associated with presentation of content by said mobile device to a user of said mobile device, said data including information regarding an event, wherein said data is also pushed from said transmitter of a communication system to one or more other mobile devices;
storing said data in a memory of said mobile device; and
in response to said event, triggering presentation of the content by said mobile device to said user based on said data stored in the memory of said mobile device simultaneously with presentation of the content by said one or more other mobile devices to one or more users of said one or more other mobile devices.

2. The method of claim 1, wherein the event comprises expiry of a timer.

3. The method of claim 2, wherein said data received from the communication system includes a timing parameter.

4. The method of claim 3, wherein the timing parameter is set by a provider of the content.

5. The method of claim 3, wherein the timing parameter is set by an entity associated with the communication system.

6. The method of claim 5, wherein said entity sets the timing parameter based on information received from a provider of the content.

7. The method of claim 2, wherein the timer is started when the content is received by an application at said mobile device.

8. The method of claim 2, wherein the timer is started in response to sending the content from a content provision server.

9. The method of claim 2, wherein the timer is started in response to transmitting content from the communication system to said mobile device and said one or more other mobile devices.

10. The method of claim 2, wherein an executable timer is received from the communication system within said data.

11. The method of claim 2, wherein an executable timer is received from the communication system in a separate transmission to the transmission of said data.

12. The method of claim 11, wherein the separate transmission of the timer is triggered by an acknowledgement message from said mobile device that said data has been received by said mobile device.

13. The method of, claim 1, wherein the event comprises reception of a triggering signal from the communication system.

14. The method of claim 1, further comprising:
encrypting at least a part of the data to prevent said users of said mobile device and said one or more users of said one or more other mobile devices from accessing the content before the event occurs.

15. The method of claim 1, further comprising:
sending of an acknowledgement of successful content delivery from said mobile device.

16. The method of claim 15, wherein the acknowledgement includes a time when the content was delivered to said mobile device.

17. The method of claim 1, further comprising:
delivering the content using a session initiation protocol.

18. The method of claim 1, wherein the receiving the data at said mobile device comprises receiving the data by a first application entity provided in said mobile device and in response to the event forwarding the content to a second application entity provided in said mobile device for presentation to said user of said mobile device.

19. The method of claim 1, wherein the receiving said data and presenting the content to said user of said mobile device are handled by an application entity of said mobile device.

20. The method of claim 1, wherein the content relates to a program.

21. The method of claim 20, wherein the program is a radio program.

22. The method of claim 20, wherein the program is a television program.

23. The method of claim 1, wherein the content relates to a mass event.

24. The method of claim 1, wherein the content enables said user of the mobile device to vote.

25. The method of claim 1, wherein the content relates to maintenance or diagnostic applications.

26. A communication system, comprising:
at least one transmitter for wireless transmission of data enabling presentation of content to the mobile users, the transmitter being configured to push the data to a plurality of mobile devices;
a service provisioning entity for handling the generation of said data, the service provisioning entity being configured to include, in said data, information regarding an event triggering the simultaneous presentation of the content by each of said plurality of mobile devices to users of said plurality of mobile devices; and
a plurality of mobile devices, each mobile device comprising a receiver for receiving said data from said at least one transmitter, a memory configured to store the data received by the receiver, and a controller configured to control the presentation of the content by the mobile device to a user of the mobile device based on the data stored in the memory, wherein the presentation of the content by the mobile devices to the users of the mobile devices is triggered simultaneously in each of said plurality of mobile devices by said event and the content is presented based on said data stored in the memory of each of said plurality of mobile devices.

27. A mobile device, comprising:
a receiver configured to receive wireless transmission of data, said data enabling presentation of content by the mobile device to a user of the mobile device;
a memory configured to store the data received by the receiver;
a user interface configured to present the content to the user; and
a controller configured to interpret the data, to detect whether said data includes information regarding an event triggering the presentation of the content, and to monitor for the event, wherein the content is presented to the user via the user interface of the mobile device in response to detection of said event and based on said data stored in the memory; and wherein the controller of the mobile device is configured to present the content to the user simultaneously to the presentation of the content by one or more other mobile devices to one or more users of said one or more other mobile devices.

28. A content presentation module, comprising:
a receiving unit configured to receive at a mobile device, from a transmitter of a communication system, data associated with presentation of content by the mobile device to a user of the mobile device, said data including information regarding an event, wherein said data is also pushed from said transmitter to one or more other mobile devices;
storing unit configured to store said data in a memory of said mobile device; and
a presentation unit configured to present the content to the user of said mobile device based on said data stored in the memory of said mobile device, in response to a triggering by said event, and simultaneously to the presentation of said content by said one or more other mobile devices to one or more users of said one or more mobile devices.

29. The module of claim 28, wherein the event comprises expiry of a timer.

30. The module of claim 29, wherein said data received from the communication system includes a timing parameter.

31. The module of claim 30, wherein the timing parameter is set by a provider of the content.

32. The module of claim 30, wherein the timing parameter is set by an entity associated with the communication system.

33. The module of claim 32, wherein said entity sets the timing parameter based on information received from a provider of the content.

34. The module of claim 29, wherein the timer is started when the content is received by an application at said mobile device.

35. The module of claim 29, wherein the timer is started in response to sending the content from a content provision server.

36. The module of claim 29, wherein the timer is started in response to transmitting content from the communication system to said mobile device.

37. A content presentation module, comprising:
receiving means for receiving at a mobile device, from a transmitter of a communication system, data associated with presentation of content by the mobile device to a user of the mobile device, said data including information regarding an event, wherein said data is also pushed from said transmitter to one or more other mobile devices;

storing means for storing said data in a memory of said mobile device; and presentation means for presenting the content to the user of said mobile device based on said data stored in the memory of said mobile device, in response to a triggering by said event, and simultaneously to the presentation of said content by said one or more other mobile devices to one or more users of said one or more mobile devices.

38. A method, comprising:

receiving at a mobile device, from a transmitter of a communication system, data associated with presentation of content;

storing said data in a memory of said mobile device;

sending an acknowledgment message indicating that said data has been received by said mobile device;

receiving from the communication system an executable timer at said mobile device in a transmission triggered by said acknowledgement message; and in response to expiry of said executable timer, triggering presentation of the content in said mobile device based on said data stored in the memory of said mobile device.

\* \* \* \* \*